(12) United States Patent
Esekow

(10) Patent No.: US 9,721,289 B2
(45) Date of Patent: Aug. 1, 2017

(54) SYSTEM AND METHODS THEREOF FOR FINANCING A PURCHASE ORDER OVER THE WEB

(71) Applicant: Behalf Ltd., RaAnana (IL)

(72) Inventor: Jeremy Esekow, RaAnana (IL)

(73) Assignee: Behalf Ltd., RaAnana (IL)

( * ) Notice: Subject to any disclaimer, the term of this patent is extended or adjusted under 35 U.S.C. 154(b) by 886 days.

(21) Appl. No.: 13/973,429

(22) Filed: Aug. 22, 2013

(65) Prior Publication Data

US 2014/0058890 A1   Feb. 27, 2014

Related U.S. Application Data

(60) Provisional application No. 61/693,287, filed on Aug. 25, 2012.

(51) Int. Cl.
*G06Q 30/00* (2012.01)
*G06Q 30/06* (2012.01)
*G06Q 40/02* (2012.01)

(52) U.S. Cl.
CPC ....... *G06Q 30/0633* (2013.01); *G06Q 40/025* (2013.01)

(58) Field of Classification Search
CPC ........................................... G06Q 30/06–30/08
USPC ................................................ 705/26.1–27.2
See application file for complete search history.

(56) References Cited

U.S. PATENT DOCUMENTS

| | | | |
|---|---|---|---|
| 6,629,081 B1 | 9/2003 | Cornelius et al. | |
| 7,014,469 B1 | 3/2006 | Nocera et al. | |
| 7,155,409 B1 | 12/2006 | Stroh | |
| 7,797,214 B2 | 9/2010 | Rosen et al. | |
| 7,797,217 B2 | 9/2010 | Rosen et al. | |
| 7,938,316 B2 | 5/2011 | Bennett et al. | |
| 7,942,316 B2 | 5/2011 | Bennett et al. | |
| 8,181,851 B2 | 5/2012 | Bennett et al. | |
| 8,214,238 B1 | 7/2012 | Fairfield et al. | |
| 2002/0095373 A1 | 7/2002 | Melchior et al. | |
| 2005/0149408 A1 | 7/2005 | Kenny et al. | |
| 2005/0149417 A1 | 7/2005 | Crescenzo et al. | |
| 2006/0149668 A1 | 7/2006 | Zafrir | |
| 2008/0133402 A1* | 6/2008 | Kurian ................. | G06Q 40/025 705/38 |

(Continued)

*Primary Examiner* — Ethan D Civan

(57) ABSTRACT

A method for financing a purchase order includes receiving a purchase order from a customer node communicatively connected to a server, wherein the purchase order includes information regarding a customer associated with the customer node, a supplier of goods, at least one item to be purchased, a cost of the purchase order and a preferable loan term; collecting metadata related to the customer associated with the customer node; analyzing the purchase order and the collected metadata to compute a credit standing for the customer; determining whether the credit standing crosses a predetermined threshold, wherein the predetermined threshold is set respective of the purchase order; requesting from a supplier node communicatively connected to the server an electronic authentication respective of the purchase order, when the credit standing crosses the predetermined threshold; and sending an electronic guarantee to finance the purchase order to the supplier node, upon reception of the electronic authentication.

34 Claims, 2 Drawing Sheets

(56) References Cited

U.S. PATENT DOCUMENTS

| | | | |
|---|---|---|---|
| 2009/0030832 A1* | 1/2009 | Chien | G06Q 20/4016 |
| | | | 705/37 |
| 2011/0015974 A1 | 1/2011 | Zafrir | |
| 2011/0313884 A1* | 12/2011 | Eze | G06Q 30/0601 |
| | | | 705/26.41 |
| 2015/0294407 A1 | 10/2015 | Weiss | |

\* cited by examiner

SYSTEM AND METHODS THEREOF FOR FINANCING A PURCHASE ORDER OVER THE WEB

CROSS-REFERENCE TO RELATED APPLICATIONS

This application claims the benefit of U.S. provisional application No. 61/693,287 filed on Aug. 25, 2012, the contents of which are incorporated herein by reference.

TECHNICAL FIELD

The invention generally relates to a computerized financing platform, and more specifically to a system and methods for financing purchase orders over the web.

BACKGROUND

When a customer wishes to buy an item from a supplier that requires financing, the customer often requests terms of repayment from the supplier. The supplier may decline to provide the customer a line of credit, since the customer is either unknown to the supplier or the risk of the customer not repaying the supplier is perceived as too great. The customer will then usually contact their lending institution to apply for a monetary loan. After checking the customer's business information and business credit standing as well as their personal information and credit history, a representative (e.g., a loan officer) of the lending institution informs the customer of the loan's terms, .e.g., the loan amount, period, and interest rate. If the customer agrees to the terms of the loan, the lender representative delivers documentation to the customer that when executed, grants to the lending institution a security interest in the purchased product for the monetary loan.

With the advantages of electronic commerce (e-commerce), many aspects of the above process may now be performed online. However, while these and other online options are significantly more convenient than their manual alternatives, they still require time and effort from customers, including the need to provide the lending institutions with sufficient evidence of security interest. Thus, the financing process as described above is currently not useful for e-commerce transactions as it requires initiating an interaction and negotiation process with the loan officer of the financial institute.

Furthermore, the described typical lending procedure does not include a structured tool for the lender to track the lent money after monetary payment to the customer, and therefore the lender cannot monitor that the lent money was actually paid by the customer to the supplier according the terms and conditions of the loan. For example, the customer may be a bakery requesting a loan for a new oven. However, the provided loan may be used for payments of debts of the bakery business. The lender in most cases has no knowledge of how the money was spent.

It would therefore be advantageous to overcome the limitations of the prior art by providing a solution for customers to finance their deals on-line while shopping for goods or services.

SUMMARY

Certain embodiments disclosed herein include a method for financing a purchase order. The method comprises receiving a purchase order from a customer node communicatively connected to a server, wherein the purchase order includes information regarding a customer associated with the customer node, a supplier of goods, at least one item to be purchased, a cost of the purchase order and a preferable loan term; collecting metadata related to the customer associated with the customer node; analyzing the purchase order and the collected metadata to compute a credit standing for the customer; determining whether the credit standing crosses a predetermined threshold, wherein the predetermined threshold is set respective of the purchase order; requesting from a supplier node communicatively connected to the server an electronic authentication respective of the purchase order, when the credit standing crosses the predetermined threshold; and sending an electronic guarantee to finance the purchase order to the supplier node, upon reception of the electronic authentication.

Certain embodiments disclosed herein also include a system for financing a purchase order. The system comprises an interface to a network for receiving and sending data over the network; a processing unit; and a memory connected to the processing unit that contains therein instructions that when executed by the processing unit configures the system to: receive a purchase order from a customer node communicatively connected to a server, wherein the purchase order includes information regarding a customer associated with the customer node, a supplier of goods, at least one item to be purchased, a cost of the purchase and a preferable loan term; collect metadata related to the customer associated with the customer node; analyze the purchase order and the collected metadata to compute a credit standing for the customer; determine whether the credit standing crosses a predetermined threshold, wherein the predetermined threshold is set respective of the purchase order; request from a supplier node communicatively connected to the network an electronic authentication respective of the purchase order, when the credit standing crosses the predetermined threshold; and send an electronic guarantee to finance the purchase order to the supplier node, upon reception of the electronic authentication.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
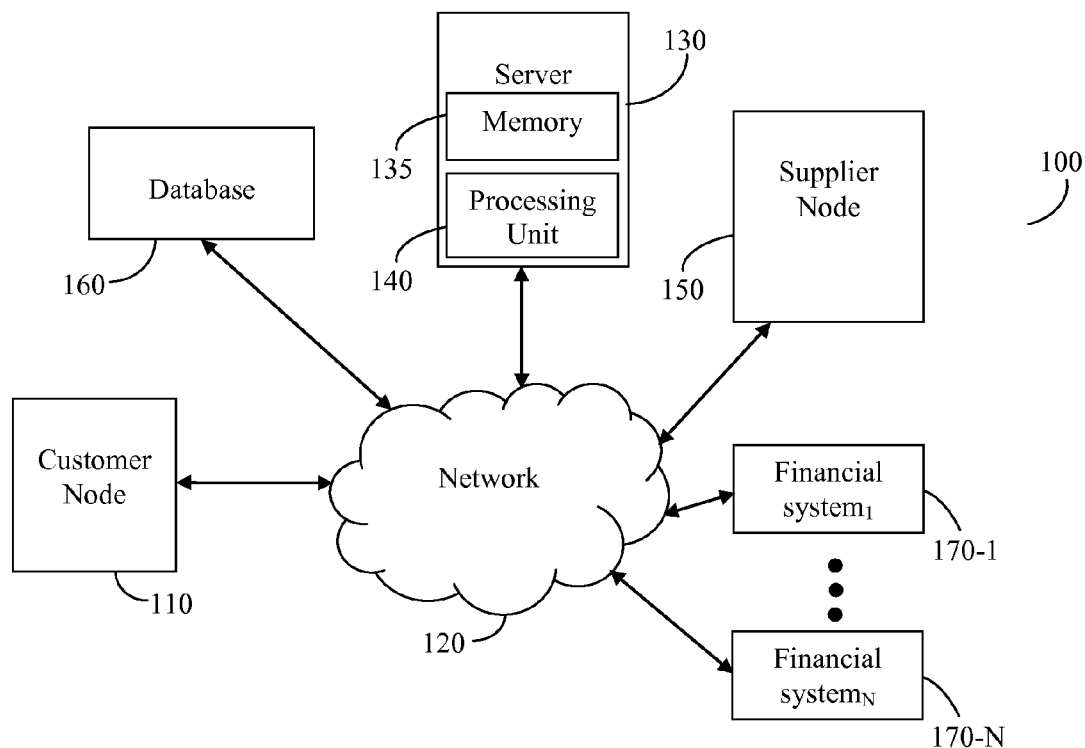
FIG. 1 is a schematic diagram of a network system utilized to described the various disclosed embodiments.

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Various exemplary embodiments disclosed herein include a system and method for financing of a purchase order (PO)

over the web. The system is configured to receive a PO request from a customer to finance a purchase order from a supplier. As further discussed below the request may be for a loan, certain repayment terms, and so on. According to another embodiment, the request to finance a purchase order may be received from a supplier who wishes to sell goods or services to the customer. A customer may be a business wishing to buy goods or services from a supplier. A customer may also be a supplier purchasing goods and services for its business. Therefore, the disclosed techniques allow business-to-business real-time financing transactions.

According to an exemplary embodiment, the customer's credit standing is determined based on at least data related to the customer. If the customer credit standing meets a threshold, it is validated with the supplier, and the authenticity and validity of the purchase order is identified on the purchase order. Upon notification of authentication the financing of the purchase order is approved, and the payment is made directly to the supplier. The financing transaction is performed by a system of the lending institution that provides service to the lending institution. The payment to finance the purchase order is performed directly to the supplier by the lending institution. The terms of the loans are determined when the customer completes the PO. It should be noted that the entire process is performed without the need to have any person to authorize the loan. The customer completes a PO online and submits the PO to a financing server that validates the PO with the supplier and determines the credit standing of the customer in real-time, in order to approve the transaction.

FIG. 1 depicts an exemplary and non-limiting schematic diagram of a network system 100 utilized to describe the various embodiments disclosed herein. A customer means of a customer device 110, such as but not limited to, a personal computer (PC), a laptop computer, a mobile device, etc., is connected to a network 120. The network 120 can be wired or wireless, a local area network (LAN), a wide area network (WAN), a metro area network (MAN), the Internet, the worldwide web (WWW), the like, and any combinations thereof. Also connected to the network 120 is a financing server 130, a supplier node 150, a database 160, and a plurality of financial systems 170-1 through 170-N. The supplier node 150 may be, for example, a PC, a tablet PC, a smart phone, a point of sale terminal, and the like.

The customer node 110 is configured to allow the customer to enter a purchase order (PO) and send the PO to the financing server 130. The PO typically contains information regarding the customer, a supplier and a supplier node 150, and the goods being purchased. The PO also includes the amount requested to buy goods or services from the supplier. In one embodiment, the customer also enters the payment terms (e.g., a number of installments or a number of days that the loan will be repaid in full). In response, the total amount due to pay the loan is displayed on the node. According to another embodiment, the request to finance a PO may also be received from a supplier who uses the supplier node 150 to sell goods or services to the customer using the customer node 110. According to this embodiment, the request includes information regarding the supplier and the supplier node, and at least partial information regarding the customer. The request may further include the validation of the PO as it is sent through the supplier node 150.

The financing server 130 is configured to determine whether the customer associated with the customer node 110 has a credit standing that crosses a predetermined threshold. The credit standing is determined for the specific customer submitting the PO. In one embodiment, the predetermined threshold is determined respective of the details in the purchase order, such as the cost of the PO, the preferable loan term, and the supplier designated in the purchase order. As a non-limiting example, if the preferable loan term is too long and/or the cost is too high, then a higher predetermined threshold is set because the risk associated with financing the PO is relatively high. The cost and loan term can be mapped to a threshold value respective of a predefined mapping table. The supplier may be designated in a table with a respective threshold.

In one embodiment, the credit standing is determined based on metadata related to the customer collected by the financing server 130. The metadata may be collected implicitly by tracking the user activity or by capturing and analyzing inputs from one or more sensors comprised on the customer node 110, such as, for example, a camera, a voice recorder, and the like. According to another embodiment, the metadata may be collected explicitly from the customer's responses to questions sent to the customer node. Such metadata may be for example, a variety of characteristics related to the customer using the customer node 110. The characteristics may be, for example, facial or voice reactions, mouse scrolling and keyboard typing, personal information from social networks, and comments and the way the user interacts with online games. According to another embodiment, the metadata related to the customer may be received from the supplier node 150.

In addition, the financing server 130 is configured to collect data related to the customer from one or more data sources 170 such as, credit bureaus, municipal data sources, federal sources, and so on. The collected data is analyzed by the financing server 130 to determine the credit standing of the customer.

According to another embodiment, the financial server 130 is further configured to collect metadata related to the supplier associated with the supplier node 150. The metadata related to the supplier may be, for example, the supplier's address, bank account details, details of the owners of the supplier, the IP address through which the supplier node 150 is connected, and so on.

In one embodiment, as part of the analysis a virtual value is generated for each element of the one or more user's characteristics and each one of the data elements collected from data sources 170. In an embodiment, a weighted decision algorithm is utilized to compute the credit standing. Accordingly, each parameter collected with respect to the customer's credit is assigned with a virtual value indicating the importance of the respective parameter to the credit standing. As an example, data collected from a credit bureau indicating the customer's financial status may receive a higher virtual value than the customer's comments in a social network website and therefore will be more significant in the determination of the customer's credit. In one embodiment, the weighted decision algorithm computes the credit standing, for example as an average sum of the virtual values.

The computation of virtual values of the collected elements may be adjusted based on the total amount of data collected. For example, if only a few elements are collected, then each such collected element will be more significant in the credit determination. Furthermore, the generation of virtual values may be adjusted respective of the received type of PO. In one embodiment, the virtual values are computed using rules stored in a database 160. Each such rule sets that value for each piece of data collected for the credit standing analysis. Examples for such rules are provided below.

Next, the financing server 130 is configured to send to the supplier node 150 a request for an electronic authentication of the PO. In one embodiment, the authentication of the PO includes checking if the goods/services requested by the customer can be timely supplied by the suppliers. It is further checked if the amount of the requested loan covers the goods/services to be purchased.

Upon receiving an authentication respective of the PO from the supplier node 150, the financing server 130 is further configured to send an electronic guarantee to finance the purchase order to the supplier node 150. Such a guarantee may include, but is not limited to, an actual transfer of funds, a certified voucher, credit card information, and the like. All data with respect of the PO is saved in the database 160. The database 160 may further include one or more rules used for determination of the virtual value of the collected elements. Therefore, the "payment" for the goods/services in the PO are paid by the directly to the financing server 130. In this embodiment, there is no interaction between the customer and the supplier. It should be noted that the financing server 130 can generate a payment plan that is sent the customer node 110 when the electronic guarantee is made to the supplier node 150.

It should be noted that the financing server 130, typically comprises a processing unit, such as a processor 140 that is coupled to a memory 135. The memory 135 contains instructions that when executed by the processing unit 140 configures the financing server 130 to perform a process described above and further discussed with reference to FIG. 2.

The financing server 130 may be any computing device that includes a controller, such as a CPU, a chip or any suitable computing or computational device. The financing server 130 may include an operating system, a memory, and storage; the executable code may be loaded into a memory. The operating system may be a commercial operating system. Memory may be or may include, for example, a non-transitory storage medium, a Random Access Memory (RAM), a read only memory (ROM), a Dynamic RAM (DRAM), a Flash memory, a volatile memory, a non-volatile memory, a cache memory, a buffer, a short or long term memory unit or any other suitable memory units or storage units. Memory may be or may include a plurality of, possibly different memory units. In one embodiment a memory has a physical structure defined by the act of storing a computer-executable program code or data.

The executable code may be any executable code, e.g., an application, a program, a process, task or script. The executable code may be executed on or by a controller under control of an operating system. For example, executable code may be an application that performs the method for financing of a purchase order (PO) as discussed herein.

The executable code may be stored in the storage, such as a database and associated program or application, a hard disk drive, a USB device or other suitable removable and/or fixed storage unit. The executable code associated with the program or any data required for the execution thereof may be loaded from the storage into the memory model where it may be used by a controller in order to process the embodiments described herein. The storage may also include cookies to be stored in the customer node 110 to track the user activity, the POs received from the customer node 110, a list of suppliers that can fulfill the POs, computed credit standings, and so on. The financing server 130 may be connected through a wired or wireless network interface card (NIC), a universal serial bus (USB) device, and the like.

Figure 2:
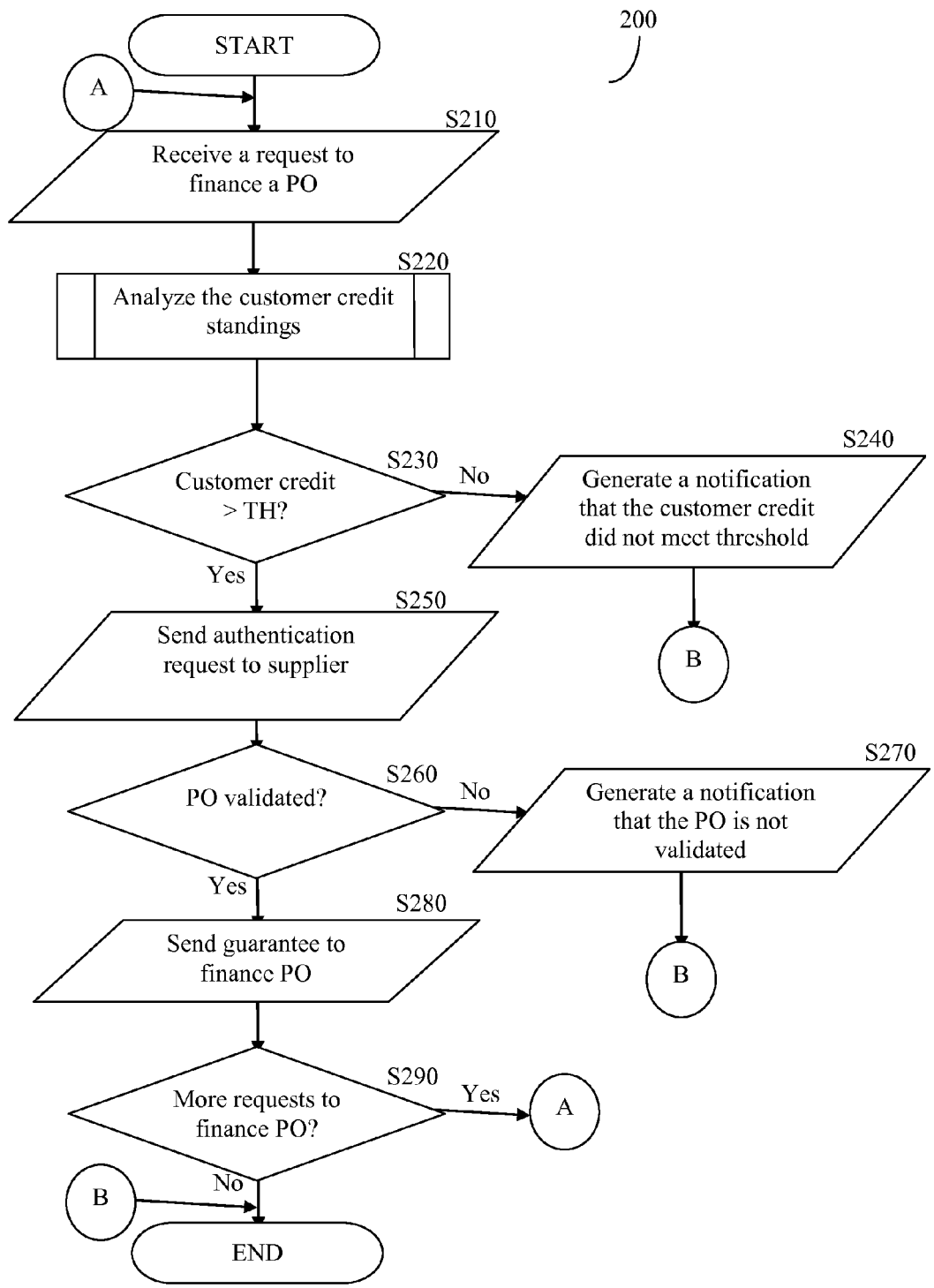
FIG. 2 is a flowchart illustrating a method for on-line financing of a purchase order according to one embodiment.

FIG. 2 depicts an exemplary and non-limiting flowchart 200 describing a financing of a purchase order (PO) in accordance with one embodiment. The method can be performed by the financing server 130. In S210, a request to finance a specific PO by means of a customer device, for example, the customer node 110 is received at the financing server 130. According to another embodiment, the request may be received from the supplier node 150. In S220 the customer credit standings are analyzed as further described hereinabove with respect of FIG. 1. As an example, the analysis can be made by asking the customer direct questions and making a real-time estimation based on the customer's answers or by statistically characterizing the customer based on data related to the customer. According to another embodiment, the request to finance the PO received from the customer node 110 is analyzed by the financing server 130 in order to compute the customer's credit standings. As an example, whether or not the customer allows the financing server 130 to provide the information received from customer node 110 to one or more external credit bureaus is considered when computing the credit standings. As another example, whether or not the customer is a one-timer loaner or a repeated one may be also considered when computing the customer credit standings. As noted above, the parameters related to the customer gathered by the server 130 and/or provided by the customer are assigned with a virtual value indicating their importance in the total credit standing of the customer.

In S230, it is checked whether the customer credit standings meet a certain predetermined threshold and if so, execution continues with S250; otherwise, execution continues with S240. According to one embodiment, one or more preconfigured rules are extracted from a database, for example, the database 160, in order to generate virtual values respective of the collected elements and determine the customer's credit standings respective thereto. For example, if the time the customer has spent in preparing the request for financing a PO crosses a certain threshold, it may indicate that the customer's level of interest in the financing is questionable and therefore the credit standing is determined as low.

In S240, a notification that the customer credit standings did not meet the predetermined certain threshold is generated and sent to the customer node. Then execution terminates.

In optional S250 a request is sent from the financing server 130 to the supplier node 150 to authenticate the validity of the PO. In case the request was received from the supplier node 150, a request to authenticate the validity of the PO is not required. In S260, it is checked whether the PO is authenticated by the supplier node, and if so, execution continues with S280; otherwise, execution continues with S270. In one embodiment if an authentication respective of a similar PO was received and is stored in database 160, then a PO can be authenticated without querying of the supplier node 150.

In S270, a notification that the PO is not authenticated is generated and sent to the customer node 110. Then execution terminates. In S280, a guarantee to finance the PO is sent to the supplier node 150. In an embodiment, an approval to finance the PO is also sent to the customer node 110. In S290 it is checked whether there are more requests to finance a PO and if so, execution continues with S210; otherwise, execution terminates.

The various embodiments of disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computerized method for processing a purchase order comprising:
   Receiving, at a server, a purchase order from a customer node communicatively connected to said server, wherein the purchase order includes information regarding a customer associated with the customer node, a supplier of goods, at least one item to be purchased, a cost of the purchase order and a preferable loan term;
   extracting a threshold value respective of information included in said purchase order, from a predefined mapping table stored in a database and mapping a plurality of costs and a plurality of loan terms to a plurality of threshold values;
   capturing, by at least one sensor installed in said customer node, a plurality of activities of said customer;
   collecting, by said server, metadata comprised of a plurality of data elements related to the customer associated with the customer node, wherein said metadata is collected at least by tracking and analyzing said captured plurality of activities;
   analyzing, by said server, the purchase order and the collected metadata to compute a credit standing for the customer, based on weighted calculation of a plurality of virtual values assigned to each of said plurality of data elements and to information included in said purchase order according to a plurality of predefined rules;
   determining, by said server, whether the credit standing crosses said threshold value;
   requesting from a supplier node communicatively connected to said server an electronic authentication respective of the purchase order, when the credit standing crosses the predetermined threshold; and
   sending, by said server, an electronic guarantee to finance the purchase order to the supplier node, upon reception of the electronic authentication.

2. The method of claim 1 wherein the customer credit standing, the collected metadata and the purchase order are saved in said database.

3. The method of claim 1, further comprising:
   sending a notification to the customer node that the customer credit standings are not sufficient.

4. The method of claim 1, further comprising:
   sending a notification to the customer node that the purchase order is not valid.

5. The method of claim 1, wherein extracting said threshold value further comprises setting the threshold value based on the cost of the purchase order, the preferable loan term, and the supplier designated in the purchase order.

6. The method of claim 1, wherein collecting metadata related to the customer further comprises:
   gathering personal parameters respective of at least one user associated with the customer, wherein said personal parameters are gathered through at least one of one or more interfaces with the customer node, at least one financial system, and at least one social media network.

7. The method of claim 6, wherein the personal parameters gathered from social media networks include at least one publically available user identifier, comments entered by the user, and the way the user interacts with online games.

8. The method of claim 6, wherein the interfaces with the customer node are at least one of: facial reaction, voice reaction, mouse scrolling, keyboard typing.

9. The method of claim 6, wherein the at least one financial system is at least one of: a credit bureau, a municipal data source, and a federal source.

10. The method of claim 6, further comprising:
    performing said computation of the credit standing based on said weighted calculation of said plurality of assigned virtual values as characterized by a mathematical formula, wherein some of said plurality of virtual values are assigned to said personal parameters.

11. The method of claim 10, wherein each of said some of said plurality of virtual values indicates an importance of a respective said personal parameter with respect to the credit standing.

12. The method of claim 1, further comprising:
    collecting metadata related to the supplier associated with the supplier node.

13. A non-transitory computer readable medium having stored thereon instructions for causing said server to execute the method according to claim 1.

14. A system for processing a purchase order, comprising:
    an interface to a network for receiving and sending data over the network;
    a processing unit;
    at least one sensor installed in a customer node for capturing a plurality of activities of a customer; and
    a memory connected to the processing unit that contains therein instructions that when executed by the processing unit configures the system to:
    receive, at a server, a purchase order from said customer node communicatively connected to said server, wherein the purchase order includes information regarding said customer associated with the customer node, a supplier of goods, at least one item to be purchased, a cost of the purchase and a preferable loan term;

extract a threshold value respective of information included in said purchase order, from a predefined mapping table stored in a database and mapping a plurality of costs and a plurality of loan terms to a plurality of threshold values;

collect, by said server, metadata comprised of a plurality of data elements related to the customer associated with the customer node, wherein said metadata is collected at least by tracking and analyzing said plurality of activities;

analyze, by said server, the purchase order and the collected metadata to compute a credit standing for the customer, based on weighted calculation of a plurality of virtual values assigned to each of said plurality of data elements and to information included in said purchase order according to a plurality of predefined rules;

determine, by said server, whether the credit standing crosses said threshold value;

request, by said server, from a supplier node communicatively connected to the network an electronic authentication respective of the purchase order, when the credit standing crosses the predetermined threshold; and send, by said server, an electronic guarantee to finance the purchase order to the supplier node, upon reception of the electronic authentication.

15. The system of claim 14, wherein said customer credit standing, said collected metadata and said purchase order are saved in said database.

16. The system of claim 14, wherein the system is further configured to send a notification to the customer node that the determined customer credit standing is insufficient.

17. The system of claim 14, wherein the system is further configured to send a notification to the customer node that the purchase order is not valid.

18. The system of claim 14, wherein the system is further configured to set said extracted threshold value based on the cost of the purchase order, the preferable loan term, and the supplier designated in the purchase order.

19. The system of claim 14, wherein the system is further configured to gather personal parameters respective of the at least one user associated with the customer node, wherein said personal parameters are gathered through at least one of one or more interfaces with the customer node, at least one financial system, and at least one social media network.

20. The system of claim 19, wherein the personal parameters gathered from social media networks include at least one publically available user identifier, comments entered by the user, and the way the user interacts with online games.

21. The system of claim 19, wherein the interfaces with the customer node include at least one of: facial reaction, voice reaction, mouse scrolling, keyboard typing.

22. The system of claim 19, wherein the at least one financial system is at least one of: a credit bureau, a municipal data source, and a federal source.

23. The system of claim 19, wherein the system is further configured to perform said computation of the credit standing based on said weighted calculation of said plurality of assigned virtual values as characterized by a mathematical formula, wherein some of said plurality of virtual values are assigned to said personal parameters.

24. The system of claim 23, wherein each of said some of said plurality of virtual values indicates an importance of a respective said personal parameter with respect of the credit standing.

25. A system for processing a purchase order, comprising:
an interface to a network for receiving and sending data over the network;
a processing unit;
at least one sensor installed in a customer node for capturing a plurality of activities of a customer; and
a memory connected to the processing unit that contains therein instructions that when executed by the processing unit configures the system to:
receive, at a server, a purchase order from a supplier node communicatively connected to said server, wherein the purchase order includes information regarding said customer associated with said customer node, a supplier of goods associated with the supplier node, at least one item to be purchased, a cost of the purchase and a preferable loan term;
extract a threshold value respective of information included in said purchase order, from a predefined mapping table stored in a database and mapping a plurality of costs and a plurality of loan terms to a plurality of threshold values;
collect, by said server, metadata comprised of a plurality of data elements related to the customer associated with the customer node, wherein said metadata is collected at least by tracking and analyzing said plurality of activities;
analyze, by said server, the purchase order and the collected metadata to compute a credit standing for the customer, based on weighted calculation of a plurality of virtual values assigned to each of said plurality of data elements and to information included in said purchase order according to a plurality of predefined rules;
determine, by said server, whether the credit standing crosses said threshold value; and
send, by said server, an electronic guarantee to finance the purchase order to the supplier node, upon determination of whether the credit standing crosses said threshold value.

26. The system of claim 25, wherein the customer credit standing, the collected metadata and the purchase order are saved in said database.

27. The system of claim 25, wherein the system is further configured to send a notification to the supplier node that the determined customer credit standing is insufficient.

28. The system of claim 25, wherein the system is further configured to extract and set said threshold value based on the cost of the purchase order, the preferable loan term, and the supplier designated in the purchase order.

29. The system of claim 25, wherein the system is further configured to gather personal parameters respective of the at least one user associated with the customer node, wherein said personal parameters are gathered through at least one of one or more interfaces with the customer node, at least one financial system, and at least one social media network.

30. The system of claim 29, wherein the personal parameters gathered from social media networks include at least one publically available user identifier, comments entered by the user, and the way the user interacts with online games.

31. The system of claim 29, wherein the interfaces with the customer node include at least one of: facial reaction, voice reaction, mouse scrolling, keyboard typing.

32. The system of claim 29, wherein the at least one financial system is at least one of: a credit bureau, a municipal data source, and a federal source.

33. The system of claim 29, wherein the system is further configured to perform said computation of the credit standing based on said weighted calculation of said plurality of assigned virtual values as characterized by a mathematical formula, wherein some of said plurality of virtual values are assigned to said personal parameters.

34. The system of claim 33, wherein each of said some of said plurality of virtual values indicates an importance of a respective said personal parameter with respect of the credit standing.

* * * * *